Nov. 18, 1924.

P. MUELLER ET AL

COMPRESSION COUPLING

Filed Jan. 9, 1920

Inventors:
Philip Mueller and
Anton C. Schuermann,

Att'ys.

Nov. 18, 1924.
P. MUELLER ET AL
1,516,396
COMPRESSION COUPLING
Filed Jan. 9, 1920  2 Sheets-Sheet 2
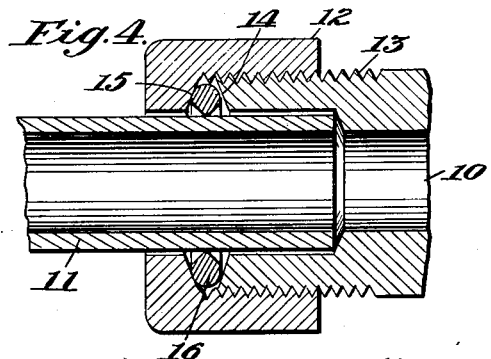
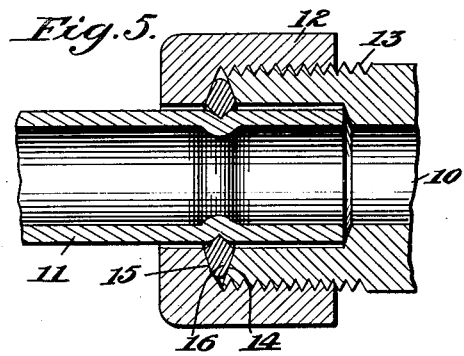
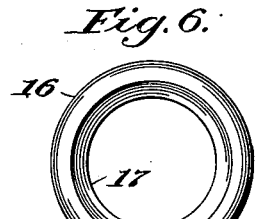
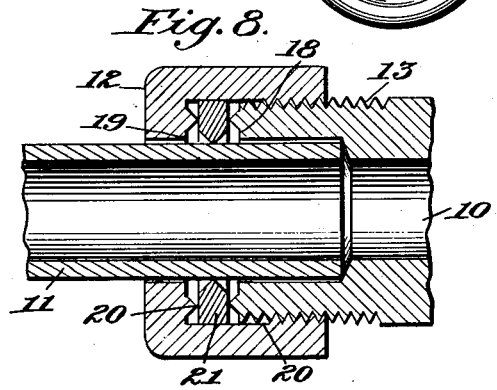
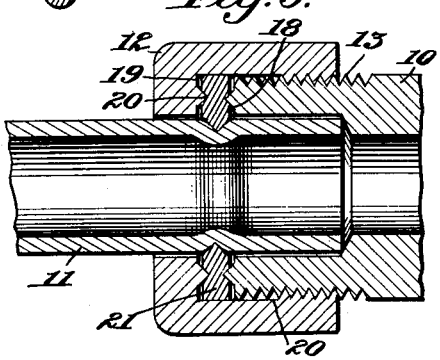
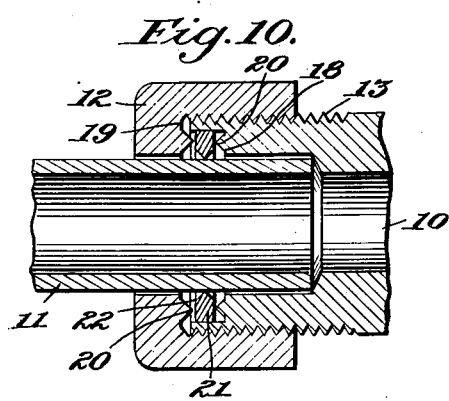
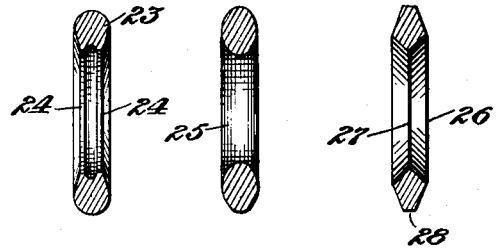
Inventors:
Philip Mueller and
Anton C. Schuermann,
Attys.

Patented Nov. 18, 1924.

1,516,396

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

COMPRESSION COUPLING.

Application filed January 9, 1920. Serial No. 350,455.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Compression Couplings, of which the following is a specification.

The present invention relates to couplings and more particularly to what are known as pipe couplings and has for its object to provide a coupling in which, without the use of packing as ordinarily used, a fluid tight joint can be formed and in which, additionally, the parts are locked against accidental displacement, although free to be uncoupled if the coupling in it be taken down. Certain other forms of the invention are embodied in applicants' co-pending application, Serial No. 354,504, filed January 27, 1920.

In the present disclosure, we show and describe the invention as applied to a faucet coupling, but it will be understood that it is applicable to any class of work to which it is adaptable, and the present disclosure is not, therefore, restrictive of the invention, but merely illustrative of one embodiment thereof.

In order that the invention may be clear to those skilled in the art, we have illustrated one embodiment of it in the accompanying drawings, in which:

Figures 4 and 5 are sectional views of a coupling having a slightly different form of compression member.

Figures 6 and 7 are elevational and sectional views of the compression member shown in Figs. 4 and 5.

Figure 1:
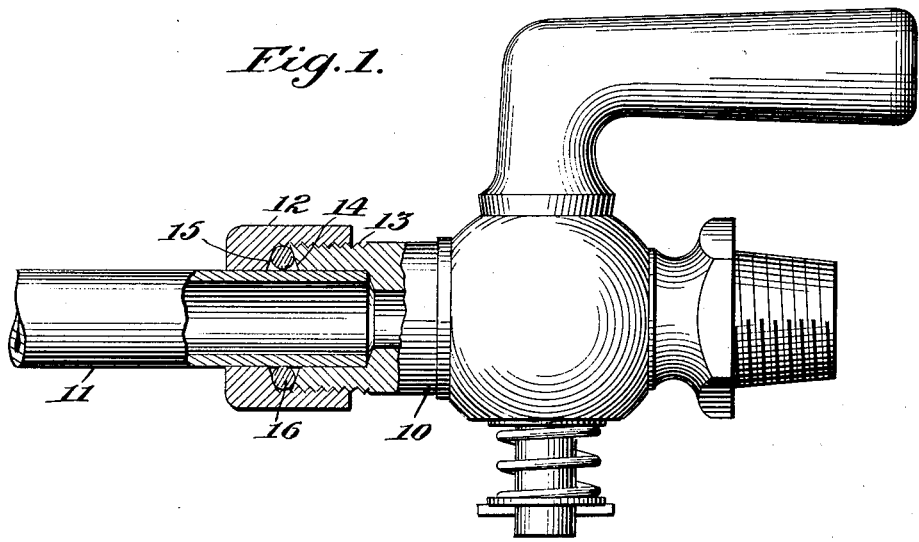
Figure 1 is a view partly in section, showing a coupling assembled but not set up or tightened.

Figures 8, 9, and 10 are sectional views of couplings and compression members of slightly different form.

Figures 11, 12 and 13 are sectional views of compression members of different forms.

Referring to the drawings by numerals, like numbers indicating like parts in the several views, 10 indicates a cock or faucet of any suitable design, which, in the present disclosure, is arbitrarily used as one of the members or devices to be coupled. The other member to be coupled is arbitrarily shown as a pipe 11, which, as here shown, telescopes in the shank of the faucet 10, which shank is provided with means to receive and retain with an adjustable engagement a nut 12, the present engaging means being shown as a threaded portion at 13, to receive a threaded coupling nut 12.

Obviously the telescoping of the parts is incidental to the illustrative disclosure herein used and not in limitation of the invention. Furthermore, interengaging means other than the threaded means shown might be utilized.

The abutting or opposed faces 14 and 15 of the threaded shank 13 and the nut 12 are dished or inclined away from each other from their perimeters toward their centers, this inclination or dish being shown in the present instance as a plain coned surface, although the faces 14 and 15 might be otherwise formed, as, for example, curved.

Between the faces 14 and 15 and surrounding the member 11 is a ring 16, preferably a continuous ring, as shown, of a size to slip readily over the end of the member 11. The ring 16 may be of different shape in cross-sections, as will be apparent from the several forms shown, for illustrative purposes, in the drawings.

It may be round, elliptical, multi-lateral, as illustrated, or, as shown in Figures 4, 5, 6 and 7, of substantially round form with its under periphery flattened somewhat to give a biting, penetrating or displacing edge 17, and this form we find very effective and satisfactory.

Figure 2:
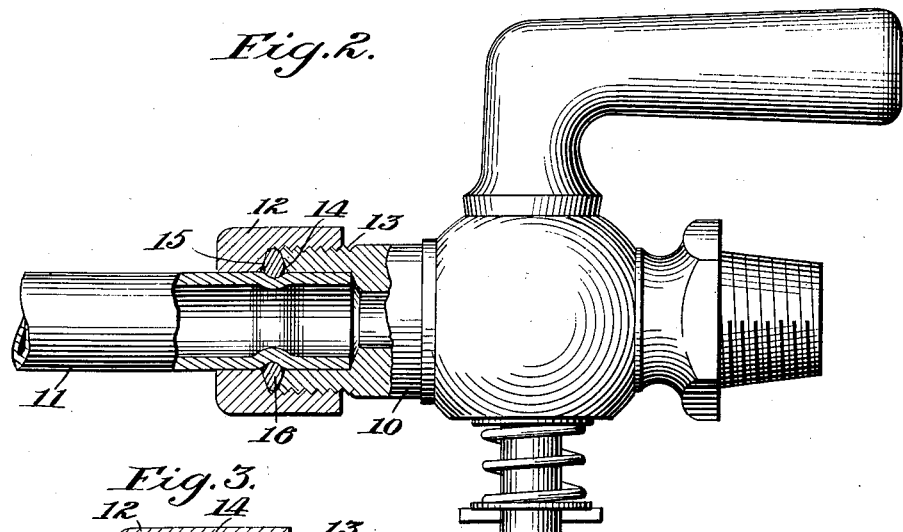
Figure 2 is a similar view with the coupling set up.
Figure 3:
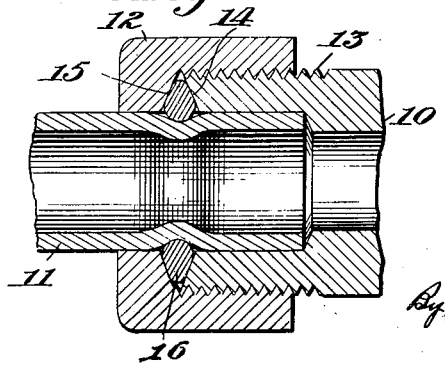
Figure 3 is an enlarged sectional view of the coupling.

The parts specified are assembled as shown in Figure 1, and the nut 12, or equivalent member, and the shank 12, or equivalent member, are then drawn together by the threaded, or equivalent, engagement described. This drawing together of the members causes their faces 14 and 15 to approach each other and compress the member 16 between them. Owing to the dish or inclination of the faces, compression of the ring 16 uniformly on its outer periphery will cause distortion of ring 16 and compression inwardly, so as to constrict the ring 16 about the member 11. Preferably such constriction will be carried to such a point that the member 11 will be indented, as shown in Figures 2 and 3, so as to lock and seal the parts and form a joint, which is fluid tight and securely locked against accidental separation.

It will be observed that the compression nut in the various embodiments shown is provided with an expansion chamber at its rear end within which the compression ring 16 is disposed for expansion in a radial direction only, the peripheral wall of the expansion chamber compelling constriction of the ring inwardly along radial lines only against the member or pipe 11.

The compression member or ring 16 will be made of a metal which will flow without fracture and of a degree of hardness which will compress and indent the member or pipe 11. It will be observed that this compression ring in all of the forms shown, is of unequal dimensions in cross section, the cross sectional axes being of unequal length and the axis of a greater length being disposed in a plane perpendicular to the central longitudinal axis of the ring. This gives a preformation which leads itself naturally to expansion in radial lines only, and the angular indenting projections at the inner periphery of the ring are, by reason of this formation, sunk quickly and securely into the metal of the member about which the ring is constricted.

In Figs. 8, 9 and 10, a slightly different development of the invention is disclosed. The faucet 10 having the threaded shank, the pipe 11, and the nut 12, are generally of the same construction as heretofore described. The opposed walls 18 and 19 of the shank and nut are, however, preferably perpendicular to the axis of the pipe and shank and provided with projections, preferably in the form of wedging annuli 20, which, when the parts are set up or drawn together, as by the threaded engagement described, will bite into the compression member 21, which, as here shown, is of flat washer-like form of a size which will fit snugly the bore of the nut 12 so that its outer periphery takes a firm bearing against the inner wall of the nut and has a biting inner periphery and by upsetting the metal of the compression member 21 cause its inner periphery to be forced into engagement with the pipe 11, as shown in Figure 9.

The disclosure in Figure 10 is very much like that in Figures 8 and 9, except that the compression member 21 is made smaller and is housed within the recessed bore 22 of the shank of the faucet 10, within which recess and on the opposed face of the nut 12 are the annuli 20 which bite into and displace the metal of the compression member and constrict it about the pipe 11.

In Figure 11, a compression member 23 is shown, in which a plurality of compressing elements 24 on the inner periphery are provided, so as to give a double upset or compression of the pipe or member about which the compression member is constricted.

In Figure 12, the compression member 25 is of elliptical form in cross-section; with its major axis perpendicular to the central longitudinal axis of the ring, this form lending itself readily to compression and a gripping action.

In Figure 13, a compression member 26 of multi-lateral form in cross-section is shown. In the particular type disclosed, the cross-section is, roughly, of a symmetrical diamond or lozenge form, the inner faces sloping to a compression edge 27 while the outer faces slope to a base 28.

With all of these forms the action is generally the same so far as compression upon the parts to be coupled is concerned, and by the construction described, which may obviously be varied by the exercise of mechanical skill and still embody the principle of my invention, a fluid-tight joint may be made without the necessity of packing, soldering, brazing or flaring the metal.

We claim:

1. In a coupling, the combination of a pair of members to be coupled, a third member adjustably engaging one of said members to be coupled, a preformed compression ring between said engaged members and in gripping relation to one of said pair of members, said compression member being adapted to be distorted and that portion of said compression member in direct contact with the member to be coupled forced in radial lines only against the last mentioned member when the engaged members are moved relatively to each other.

2. In a coupling, the combination of a pair of members to be coupled, a third member adjustably engaging one of said pair of members, a continuous preformed compression ring between said engaged members and in gripping relation to the other of said pair of members, the opposed faces of said engaged members in radial lines only being of such conformation as to compress a portion of said compression ring against one of said engaged members when said engaged members are moved relatively to each other.

3. In a coupling, the combination of a pair of members to be coupled, a third member adjustably engaging one of said pair of members, a continuous preformed compression ring between said engaged members and in gripping relation to the other of said pair of members, the opposed faces of said engaged members being of such conformation as to constrict and compress a portion of said compression ring about one of said members in radial lines only when said engaged members are drawn together.

4. In a coupling, the combination of two telescoping members, a third member adjustably engaged with one of said members, a continuous preformed compression ring between said engaged member and surrounding the other of said telescoping members, and compressing means on said engaged members to constrict and compress a portion of said compression ring against one of said telescoped members in radial lines only when said engaged members are drawn together.

5. In a coupling, the combination of two telescoping members, a third member threaded to the telescoped member, a continuous preformed compression ring on the telescoping member and between the opposed faces of said third and telescoped members, said opposed faces being so formed as to force a portion of said compression ring inward along radial lines only against said telescoping member.

6. In a coupling, the combination of two telescoping members, a third member threaded to the telescoped member, a continuous preformed compression ring having an indenting inner periphery mounted on the telescoping member and lying between the opposed faces of said third and telescoped members, said opposed faces being so inclined as to force a portion of said compression ring inward along radial lines only and its indenting inner periphery against and into said telescoping member.

7. In a coupling, the combination of two telescoping pipes, a nut threaded to one of said pipes, a compression ring having a preformed indenting inner periphery between the opposed faces of said nut and the outer of said pipes, said opposed faces flaring inwardly in a radial direction toward the inner of said pipes so as to give a V-shaped compression chamber and force a portion of said compression member inward along radial lines only and indent said inner pipe.

8. A preformed compression ring for compression couplings, having unequal cross sectional axes, the major axis lying in a plane substantially perpendicular to the central longitudinal axis of the ring, said ring having an indenting rib on its inner periphery.

9. A preformed compression ring for compression couplings having unequal cross sectional axes, the major axis lying in a plane substantially perpendicular to the central longitudinal axis of the ring, said ring having a plurality of indenting ribs on its inner periphery.

10. A preformed compression ring for compression couplings having unequal cross sectional axes, the major axis lying in a plane substantially perpendicular to the central longitudinal axis of the ring, said ring having converging sides to form an indenting rib on its inner periphery.

In testimony whereof we have hereunto set our hands.

PHILIP MUELLER.
ANTON C. SCHUERMANN.